United States Patent [19]

Canin

[11] 3,901,612
[45] Aug. 26, 1975

[54] RELEASEABLE JOINT
[76] Inventor: Jacques Canin, 1708 Notre Dame West, Victoriaville, Quebec, Canada
[22] Filed: June 28, 1974
[21] Appl. No.: 484,277

[30] Foreign Application Priority Data
May 10, 1974 Canada................................ 199749

[52] U.S. Cl. ................ 403/189; 52/656; 52/758 H; 403/264
[51] Int. Cl.² .......................................... F16B 7/08
[58] Field of Search .......... 403/189, 187, 183, 230, 403/231, 264; 52/285, 475, 476, 656, 758 H, 758 C, 758 R

[56] References Cited
UNITED STATES PATENTS
2,129,432  9/1938  Lipp..................................... 403/187
2,941,855  6/1960  Weill................................... 52/758 H
FOREIGN PATENTS OR APPLICATIONS
1,191,539  4/1965  Germany.............................. 52/656

Primary Examiner—Werner H. Schroeder
Assistant Examiner—Wayne L. Shedd
Attorney, Agent, or Firm—Alan Swabey; Paul Marcoux

[57] ABSTRACT

A joint comprising a pair of frame members, each having a flat end face and a flat side face, the two members being interconnected with the end face of one member flatly abutting the side face of the other member and a connector for securing the two frame members together. This connector has a flat plate mounted for sliding motion in a track running along the flat side face of one member and opening into the flat end face of the other member; a screw mounted for rotation on the plate to project perpendicularly therefrom and a flat lug integral with the first plate as an extension thereof bent over the screw. The latter is threaded into a tapped bore opening into the flat end face of the other member while the flat lug is inserted into a correspondingly shaped groove of the said other member to prevent relative rotation of the two frame members. The said other member has a trench opening into one of its side faces, the tapped bore likewise opening into this trench whereby the latter gives access to the screw to clamp the two frame members together or to release them.

5 Claims, 13 Drawing Figures

3,901,612

RELEASEABLE JOINT

BACKGROUND OF THE INVENTION

1. Field of the Invention

The present invention relates to knock-down frame assemblies and more specifically to a dismountable joint connecting the frame members of said assembly.

2. Description of the Prior Art.

Knock-down frames of the above type are widely used particularly in the construction of office and commercial furnitures and equipment such as in modular wall partitions, display panels and stands, store counters, shelving units, desks, tables, credenzas and the like. Examples of such frames are given in the following U.S. patents: U.S. Pat. Nos. 3,186,561 (Strassle); 3,250,584 (Tassell); 3,458,052 (Kann); 3,513,606 (Jones); 3,525,560 (Grasner et al), and 3,661,434 (Alster). However, these articles all seem to lack the quality of being cheap to produce and easy to assemble while providing a structure which is rigid and permit rapid assembly, dismantling and adjustments of rectangular frames.

SUMMARY OF THE INVENTION

An object of the present invention is to provide a joint wherein the connected frame members can easily and rapidly be assembled, dismantled and adjusted. More specifically, the joint of the present invention comprises: a pair of frame members each having a flat end face and a flat side face, the two members being interconnected with the end face of one member flatly abutting the side face of the other member; a connector having a first part mounted for sliding motion of said connector along the flat side face of one of said members; a threaded axially rotatable second part threaded into a tapped bore opening into the flat end face of the other of said members, and a shaped third part inserted into a correspondingly shaped groove of the other of said members to prevent rotation of said members, and means, provided in said other member, to allow access to said threaded second part for rotation thereof.

In a preferred form of the invention, each member is formed with a track running parallel to the flat side face and opening into the flat end face of each member, the above-mentioned first part being a flat plate which is inserted into such a track to be slidably displaced therein. Still according to a preferred embodiment, there is provided a through passageway which joins the flat side face and the track of each frame member, the threaded second part being a screw mounted for rotation on the plate to project perpendicularly therefrom through this passageway. Preferably also, the third member is a flat lug integral with the flat plate as an extension thereof bent over the screw, the correspondingly shaped groove of the other member opening into the flat end face thereof.

It will be appreciated that such a joint provides a simple means to interconnect two frame members positively and securely, while avoiding any possibility of relative rotation between the members.

Another feature of such a joint is to provide a frame construction which permits a first rough assembly to be made manually and a final more accurate assembly provided by final tightening of the screw forming the second part of the connector. It also follows that a joint according to the present invention, once tightly assembled, cannot easily be undone or dismantled without first having intentionally loosened the aforesaid screw.

BRIEF DESCRIPTION OF THE DRAWINGS

A specific embodiment of the invention will now be described with respect to the appended drawings wherein.

DESCRIPTION OF THE PREFERRED EMBODIMENT

Figure 1:
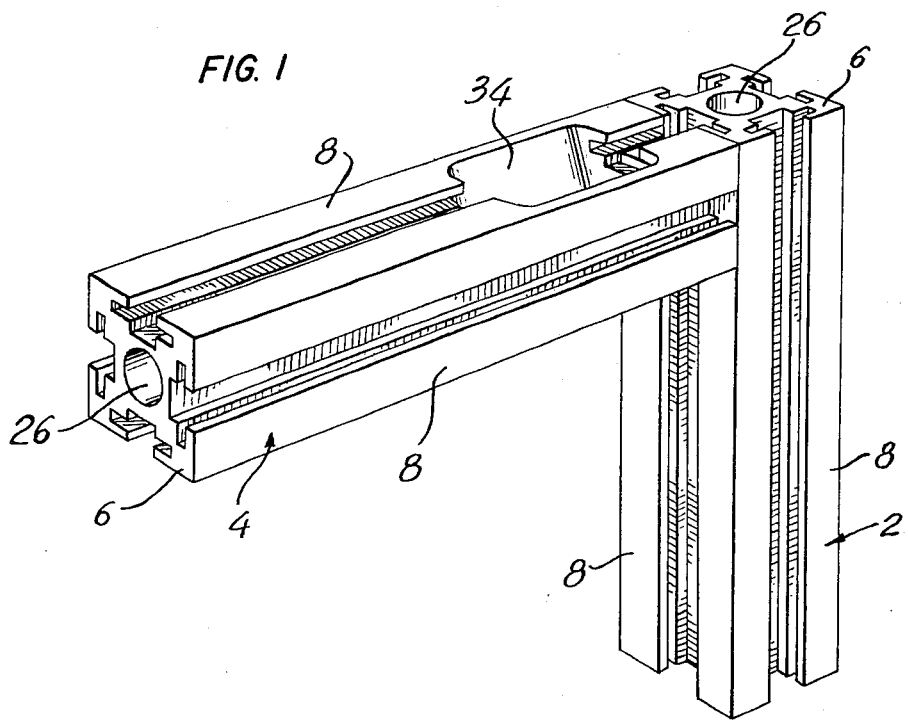
FIG. 1 is a perspective view of a preferred embodiment of the connection between two frame members, according to the present invention.
Figure 2:
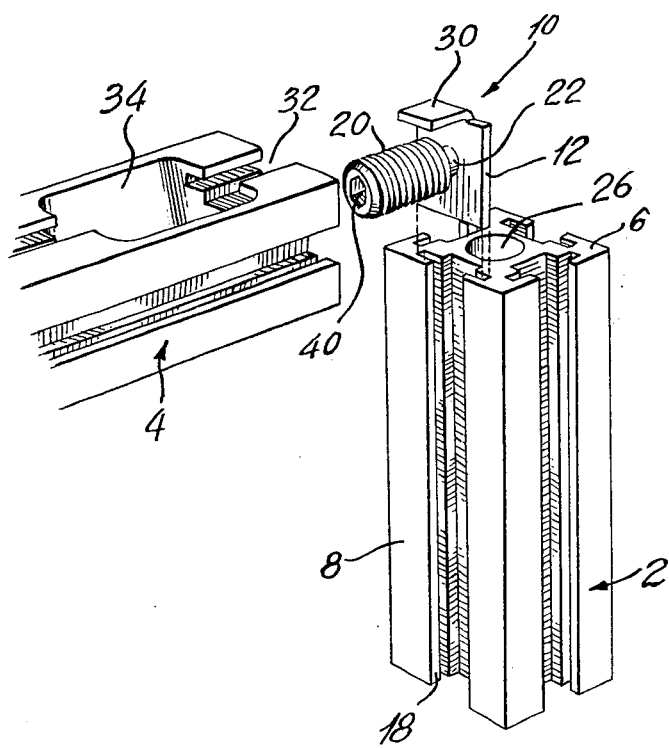
FIG. 2 is an exploded perspective view of same.
Figure 3:
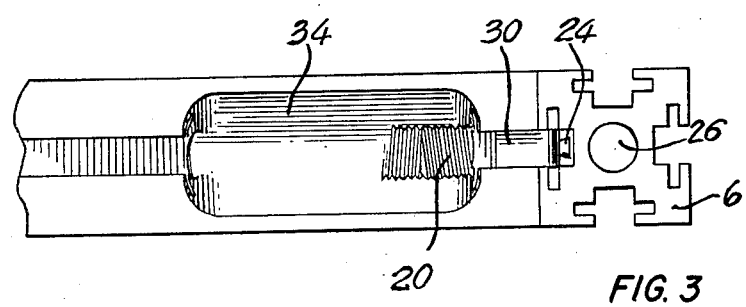
FIG. 3 is a top plan view of same.

FIGS. 1 to 4 illustrate a rectangular T-shaped joint formed of a pair of identically profiled members 2 and 4, the member 2 being an upright post and the member 4 a horizontal one. Each member is generally square in cross-section, having further a flat face 6 at each end and four flat side faces 8, members 2 and 4 being interconnected with one end face 6 of member 4 flatly abutting one flat side face 8 of member 2, as clearly shown. The two frame members are held together by means of a connector 10, best illustrated in FIG. 2 and made up of three parts.

A first part is in the form of a plate 12 adapted to be slidably received into a track running parallel to the flat side face 8 (FIG. 5) and formed by a pair of recesses 14 opening into a groove 16 defining a passageway 18 connecting the said track and the flat side face 8. As shown, members 2 and 4 are symmetrical and all four side faces thereof are provided with such recess and groove configuration as above-described. Frame members 2 and 4 are metal extrusion shapes.

The second part of the connector 10 is a screw 20 mounted for rotation about its longitudinal axis on the plate 12 to project perpendicularly therefrom. When plate 12 slides in the track of the post 2, the screw 20 extends across the passageway 18 and, for that purpose, is provided with a shank 22 of reduced diameter, the screw 20 being held onto the plate 12 by a rivet head 24 (FIGS. 3 and 4) in a manner such as to allow free rotation of screw 20 with respect to plate 12.

Figure 4:
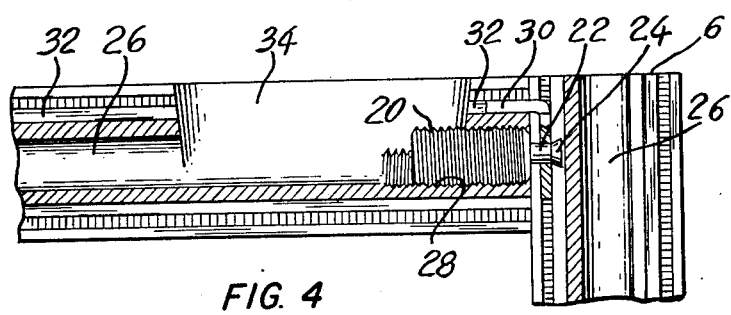
FIG. 4 is a sectional elevation view of same taken in the common axial plane of the two members.

The screw 20 is received into a bore 26 of the horizontal member 4 and, for this purpose, a portion of that bore 6 is tapped, as at 28 (FIG. 4).

The third part of the connector 10 is a shaped element in the form of a flat lug 30 which is integral with the flat plate 12 and appears as an extension thereof which is bent over the screw 20. In assembled condition of the joint, the lug 30 is received in a correspondingly shaped groove 32 of member 4 (FIG. 4).

Figure 5:
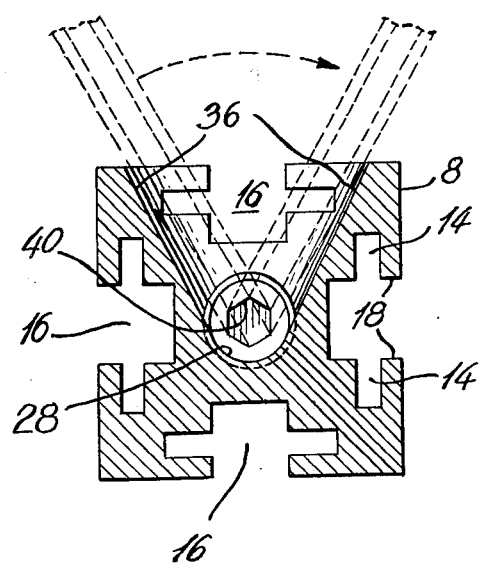
FIG. 5 is a cross-sectional view taken on line 5—5 of FIG. 3.
Figure 6:
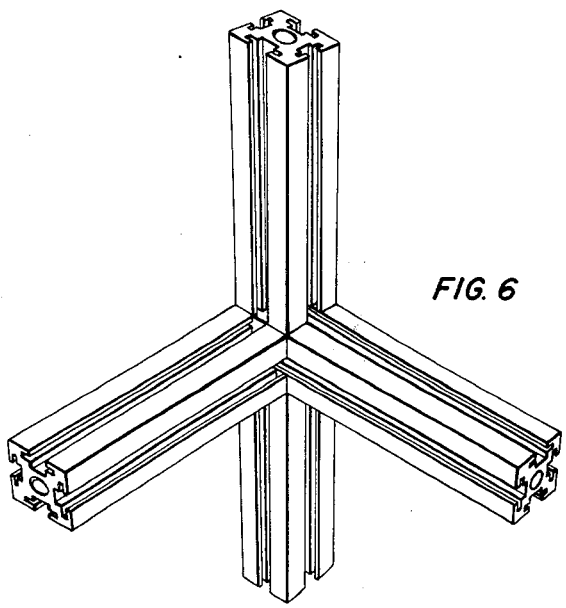
FIG. 6 is a perspective view of one frame arrangement.
Figure 7:
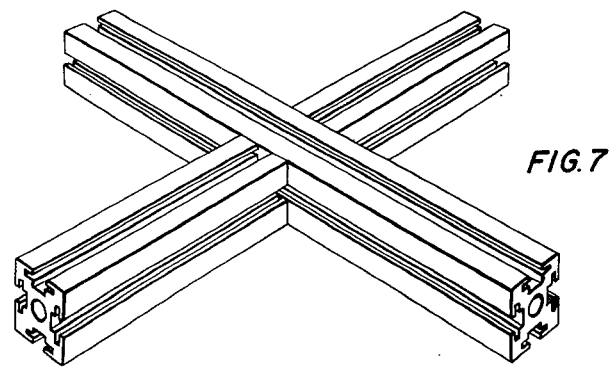
FIG. 7 is a perspective view of yet another frame arrangement.
Figure 8:
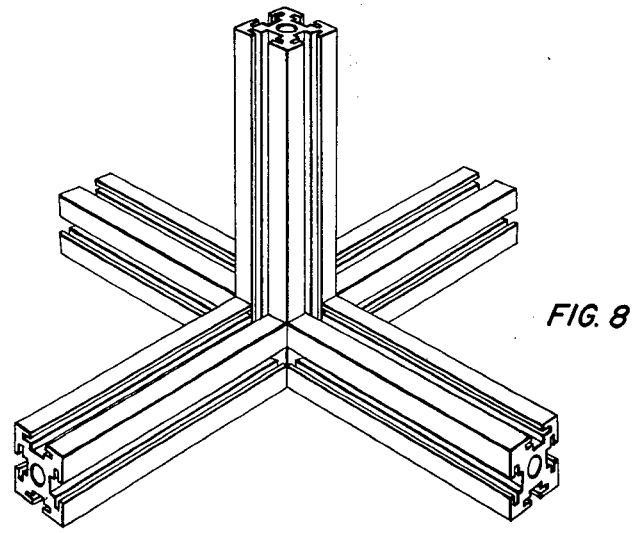
FIG. 8 is a perspective view of another frame arrangement.

FIGS. 4 and 5 illustrate a V-shaped trench 34 of which the inclined walls 36 are tangent to the bore 26. This trench 34 gives an hexagonal key 38 (shown in broken line in FIG. 5) an access to a correspondingly hexagonal hole 40 of the screw 20.

As will readily be gathered from the above-descripton, the joint is formed by first inserting the plate 12 of the connector 10 in the track formed by the recesses 14 and sliding it to the desired location along the face 8 of the post 2. The horizontal frame member 4 is then disposed so that the screw 20 enters the tapped length 28 of the bore 26 and the key 38 rotates the screw 20 to draw members 2 and 4 close to one another and finally, by further rotation of the screw 20, the two members are forcibly gripped and frictionally secured together by abutment of the corresponding flat end face 6 of the horizontal frame member 4 and the flat side face 8 of the upright frame member 8. Referring to FIG. 4, it will be seen that insertion of the lug 30 into its mating groove 32 prevents relative rotation of the members 2 and 4.

In the above embodiment, it will be noted that the recesses 14, forming the track of member 2 into which the plate 12 is received, also serve, in member 4, as the groove 32 adapted to receive the lug 30.

As aforesaid, this assembly is very easy to mount for providing a very rigid joint. It can be used for example for making connections such as the ones illustrated in FIGS. 6 to 12.

Figure 9:
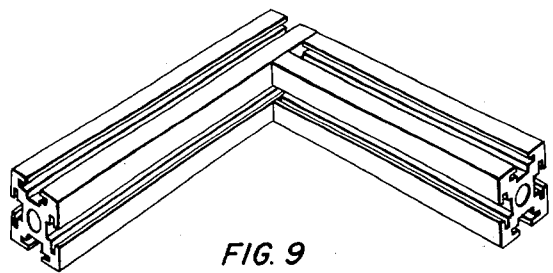
FIG. 9 is a perspective view of another frame arrangement.
Figure 10:
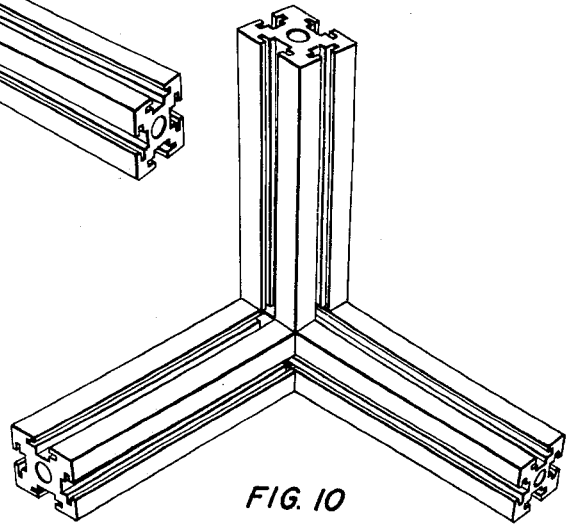
FIG. 10 is a perspective view of another frame arrangement.
Figure 11:
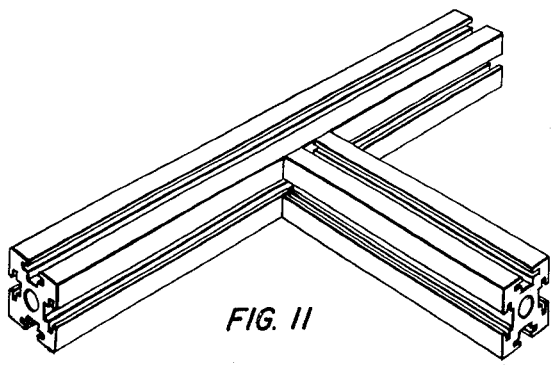
FIGS. 11 and 12 are perspective views of yet other frame arrangements.
Figure 12:
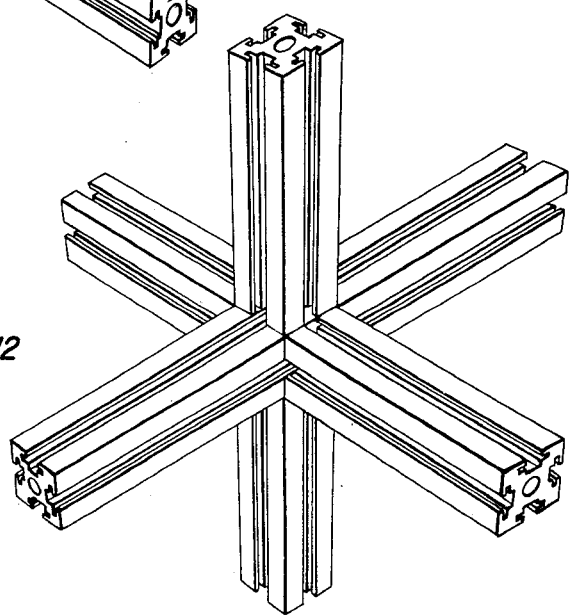
Figure 13:
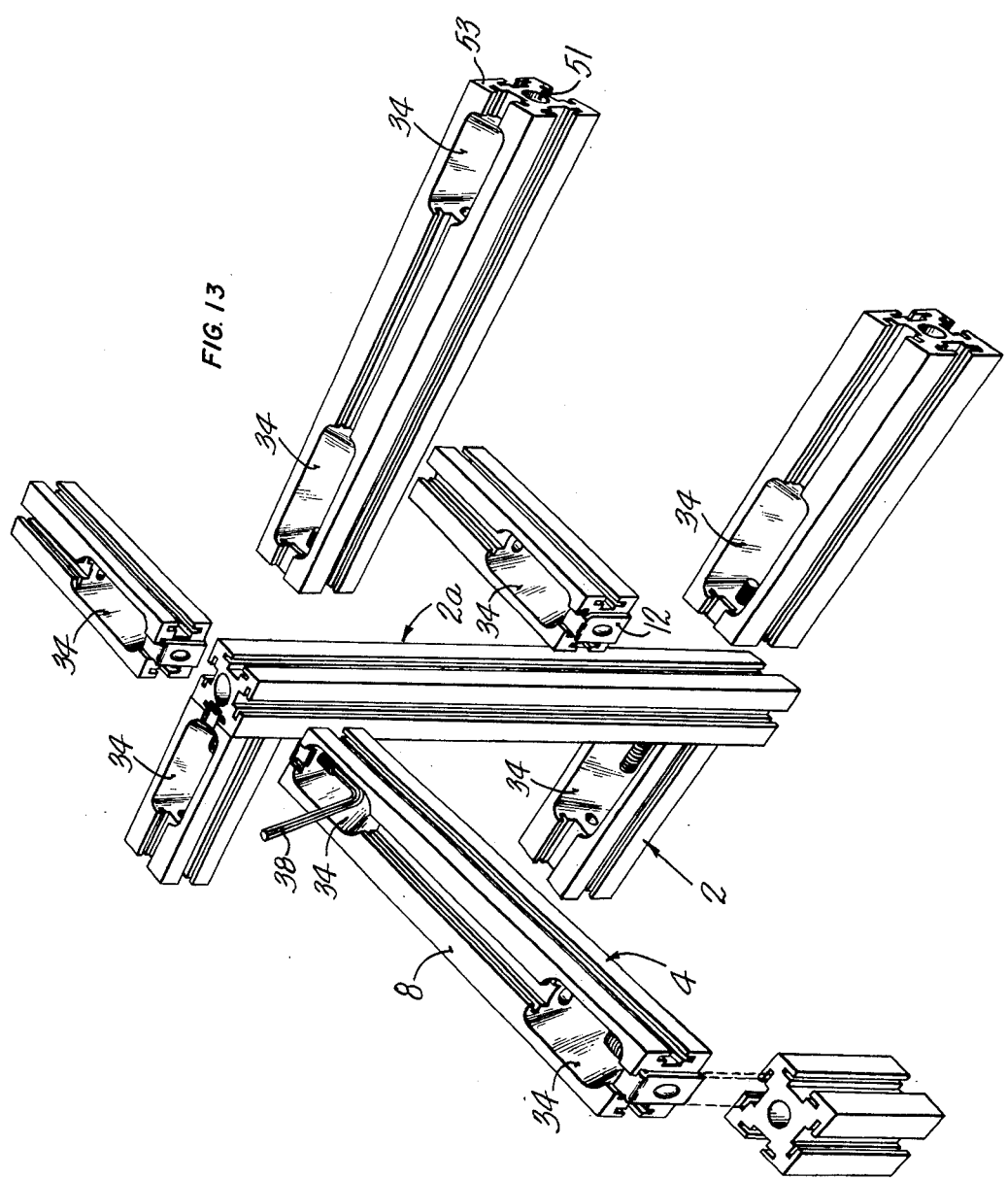
FIG. 13 is an exploded view showing the mounting of various profiled members for obtaining a frame structure.

For a better understanding of the mounting of various joints, reference should particularly be made to FIG. 9 of the drawings wherein it will be seen that a particular frame member 2 or 4 can have one or two trenches 34 or none at all in the case of frame member 2a.

I claim:
1. A joint comprising:
   a. a pair of frame members each having a flat end face and a flat side face, the two members being interconnected with the end face of one member flatly abutting the side face of the other member;
   b. each member being formed with a track running parallel to said flat side face and opening into said flat end face;
   c. a through passageway in each frame member connecting the flat side face and the track thereof;
   d. a connector having:
      — a first part mounted for sliding motion of said connector along the flat side face of one of said members;
      — said first part consisting of a flat plate inserted into the track of said one of said members to be slidably displaced therein;
      — a threaded axially rotatable second part threaded into a tapped bore opening into the flat end face of the other of said members;
      — said threaded second part consisting of a screw mounted for rotation on said plate to project perpendicularly therefrom;
      — a flat lug integral with said first part inserted into a correspondingly shaped groove of the other of said members to prevent relative rotation of said members; and
   e. means, provided in said other member, to allow access to said threaded second part for rotation thereof.

2. A joint as claimed in claim 1, wherein said (third member is a) flat log is integral with said flat plate as an extension thereof bent over said screw, said correspondingly shaped groove of said other member opening into the flat end face of said one member.

3. A joint as claimed in claim 1, wherein said means to allow rotation of said threaded second part is a trench formed in said members and opening on one side face thereof, said tapped bore opening into said trench whereby the latter gives access to said second threaded part to allow rotation thereof, by means of a tool insertable into said trench.

4. A knock-down frame assembly comprising at least two elongated profiled members, each having an essentially square cross-section, each face of said profiled member being formed with a longitudinal rectangular groove having lateral walls and a bottom wall, a longitudinal auxiliary groove formed in both said lateral walls, said auxiliary grooves defining a pair of overlying spaced longitudinal flanges in each face of said elongated profiled member, each said profiled member formed with a centrally disposed axial cylindrical bore, a trench formed in at least one said profiled member, said trench opening in one face of said profiled member and extending into said bore, one said trench being provided near at least one end of said profiled member, a rectangular plate shaped to be engageable by said auxiliary grooves of a first profiled member, said rectangular plate having a central hole and a projecting tab bent at 90° angle with respect to said rectangular plate, said projecting tab engageable at the bottom wall of said rectangular groove of a second profiled member, a screw adapted to be inserted through said trench into a threaded portion of said bore said screw having a non-threaded end which is inserted through said hole and formed into a rivet head for pulling said metal plate and abutting one face of said first profiled member against the end of said second profiled member, said screw having a profiled socket formed at the other end thereof to permit insertion therethrough of a profiled key thus enabling rotating of said screw through said threaded hole.

5. A knock-down frame assembly according to claim 4, wherein said screw has a profiled socket formed at the other end thereof to permit insertion therethrough of a profiled key thus enabling rotating of said screw in said tapped bore.

* * * * *